United States Patent

[11] 3,607,003

[72] Inventor Harold H. Stotler
Westfield, N.J.
[21] Appl. No. 783,490
[22] Filed Dec. 13, 1968
[45] Patented Sept. 21, 1971
[73] Assignee Hydrocarbon Research, Inc.
New York, N.Y.

[54] METHOD OF REMOVING ACETONE AND ACIDIC GASES FROM GASEOUS MIXTURES
3 Claims, 1 Drawing Fig.
[52] U.S. Cl. ........................................................ 23/2 R,
55/68, 55/73
[51] Int. Cl. ................................................. B01d 53/16
[50] Field of Search ........................................... 23/2, 2.3, 3,
3.1; 55/68, 73; 260/593

[56] References Cited
UNITED STATES PATENTS
2,785,045 3/1957 Shen Wu Wan et al. ....... 23/2
3,225,519 12/1965 Stotler ............................ 55/68 X
OTHER REFERENCES
The Merck Index, Merck & Co., Inc. Rahway, N.J. 7th Ed., 1960, page 420.

Primary Examiner—Earl C. Thomas
Attorney—Nathaniel Ely

ABSTRACT: A process for removal of acetone vapors and acidic gas contaminants from a purified hydrogen stream by contacting the stream with an aqueous solution of monoethanolamine when the partial pressure of the acidic gas contaminants is low such that the acidic gas carrying capacity of the monoethanolamine solution exceeds that of acetone.

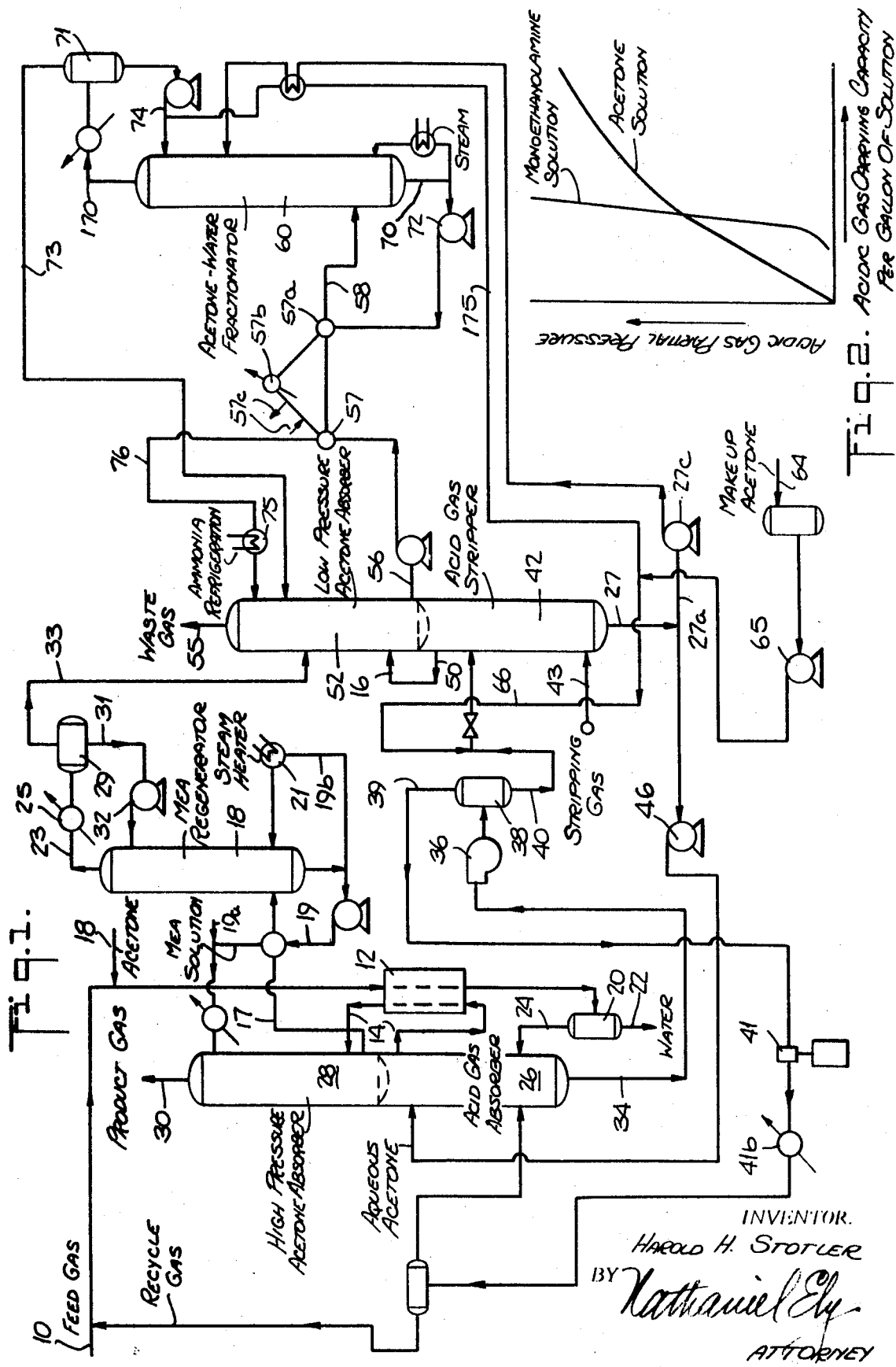

METHOD OF REMOVING ACETONE AND ACIDIC GASES FROM GASEOUS MIXTURES

BACKGROUND OF THE INVENTION

This invention relates to an improved absorption technique that is useful in gas absorption processes that utilize acetone as an absorption medium for acid gases such as carbon dioxide and hydrogen sulfide. An example of such an acetone absorption process is found in Stotler, U.S. Pat. No. 3,225,519, owned by the assignee of the present invention.

In the Stotler process, acetone is used as an absorption medium for acid gas contaminants that are found in a gas stream composed primarily of hydrogen. In order to remove acetone vapors from the hydrogen containing product mixture, a high pressure acetone absorber or scrubber unit is utilized. The absorbent medium in such a device is water. Although this absorbent removes acetone vapors from the product gas, it does not also reduce to any appreciably extent the level of acid gas contaminants that still remain in the product gas. In order to remove carbon dioxide to as low as 50 parts per million and hydrogen sulfide to as low as 1 part per million, two acetone absorption stages must be used in the high pressure acid gas absorber.

The present invention utilizes a novel absorbent medium that accomplishes the absorption of the acetone vapors in the acetone absorber while at the same time aiding in reducing the amount of acid gas contaminants in the product gas. It has been found that it is possible to reduce the carbon dioxide level in the product gas down to 50 parts per million and the hydrogen sulfide level down to as low as 1 part per million by use of my invention with the use of only one acetone absorption stream in the acid gas absorber.

SUMMARY OF THE INVENTION

More particularly, my invention relates to an acetone absorbent that comprises an aqueous monoethanolamine solution having a strength of approximately 15 percent monoethanolamine by weight.

In order to reduce the carbon dioxide level in the product gas down to 50 parts per million and the hydrogen sulfide level down to about 1 part per million without using a two-stage acetone absorbent, the monoethanolamine solution should be used when its carrying capacity for the contaminants is greater than that of an acetone absorbent. It has been found that at lower partial pressures of acidic gas contaminants these conditions are found. The increased removal power of monoethanolamine falls off as one increases the partial pressure of the acidic gas component while that of acetone continues to increase.

DESCRIPTION OF THE DRAWINGS

FIG. 1 is a flow diagram of an acetone absorption process which utilizes a monoethanolamine absorption and regeneration apparatus for removal of acetone vapors and acid gas contaminants from a gaseous hydrogen stream.

FIG. 2 is a diagram that illustrates the increased acidic gas carrying capacity of a monoethanolamine solution compared to that of an acetone solution as one approaches lower partial pressures.

DESCRIPTION OF THE PREFERRED EMBODIMENT

The schematic flow diagram of FIG. 1 is particularly adapted to the removal of carbon dioxide and hydrogen sulfide from a high pressure feed gas comprising hydrogen, with lesser amounts of other gases including carbon monoxide and methane. A feed gas comprising a mixed gas of approximately 61 percent hydrogen, about 33 percent carbon dioxide, and about 0.43 percent hydrogen sulfide enters the system at 10 under high pressure, in the order of 1,000 p.s.i.g. and is preferably cooled to a temperature of about 65 ° F. by heat exchange at 12 with the acetone containing product gas 14 to remove any condensate, usually water. The condensate separated from the gas in knockout drum 20 is removed at 22, and the gas is then introduced at 24 into the bottom of the acid gas absorber 26. Under preferred conditions, the absorber 26 is operated at 1,000 p.s.i.g. with the average temperature in the range of 55 ° F. Acetone, as a hydrate depressant has been injected into the system at 18.

Aqueous acetone is introduced at 27 into the top of acid gas absorber 26 for a countercurrent contact with the gas, and the acetone contaminated product gas, primarily hydrogen, leaves at 14 from the top of absorber 26. This acetone-containing purified hydrogen stream then passes through the countercurrent heat exchanger 12 and into a high pressure acetone absorber tower 28 for scrubbing with an absorption stream that comprises about a 15 percent by weight solution of monoethanolamine to remove acetone vapors and further remove acid gas contaminants such as carbon dioxide and hydrogen sulfide that are still contained in the gas. The absorber 28 is preferably operated at about 1,000 p.s.i.g. Use of a 15 percent by weight solution of monoethanolamine as an absorbent for acetone in absorber 28 at low acid gas partial pressures allows one to absorb the acetone and at the same time reduce the carbon dioxide and hydrogen sulfide concentration in the purified hydrogen stream to desired levels without necessitating a two stage acetone absorbent stream in high pressure absorber 26. The purified product gas steam 30 is removed from the top of absorber 28 with about 50 parts per million carbon dioxide, about one part per million hydrogen sulfide and only about one part per million of acetone.

The acidic gas component, such as carbon dioxide and hydrogen sulfide, that is contained in the mixed gas stream is most advantageously removed by the monoethanolamine solution by having the partial pressure of the acidic gas relatively low. FIG. 2 illustrates the variation in the carrying capacity of solutions of monoethanolamine and acetone as one varies the partial pressure of the acidic gas component. The carrying capacity of monoethanolamine is higher than that of acetone at low partial pressures, but eventually falls behind as the partial pressures are increased to higher values. Since acetone must be removed in absorber 28 in order to give a pure product, the incorporation of a monoethanolamine solution rather than water in the absorber 28 results in a reduction of acidic gas contaminants as well as to produce a purer product. The partial pressure of the acidic gas contaminants will be quite low since they form a relatively low proportion of the gases that leave absorber 26.

It should be pointed out that this type of enhanced acidic gas carrying capacity of monoethanolamine is found for both carbon dioxide and hydrogen sulfide systems. The point at which the acetone and monoethanolamine carrying capacities are equal varies with process conditions. It is subject to such variables as total pressure and temperature. However, it is well within the skill of one in the art to determine the point at which this occurs and to adjust the design conditions to insure that the partial pressure is lower than this value. For example, it has been found that when carbon dioxide is the acidic gas component, when the total pressure is 500 p.s.i.a. and when the temperature is 80 ° F. that the partial pressure of the carbon dioxide should be lower than about 90 p.s.i.a. to take advantage of the monoethanolamine's increased gas carrying capacity.

When one is working with this improved process, the circulation rate of the monoethanolamine solution may be set at a certain level to remove a certain proportion of the acidic gas contaminants. The conditions in absorber 26 can then be set to reduce the level of acidic gas contaminants that leave by line 14 and enter absorber 28. By reducing the proportion of these contaminants to levels which insure a partial pressure in absorber 28 below that at which the acetone and monoethanolamine carrying capacities are equal, the reaction can proceed most advantageously.

The acetone-monoethanolamine stream that is removed from high pressure absorber 28 by line 17 is directed to a monoehtanolamine regenerator 18 which separates the absorbed acetone and absorbed acid gases from the monoethanolamine solution. The solution is recycled to absorber 28 through line 19 for further contact with the purified stream of mixed gases that contains acetone. Makeup water and monoethanolamine may be added by line 19a. A steam heater 21 is provided in line 19b to provide the reboiler duty for regenerator 18. The acetone and acid gases removed by regenerator 18 are sent through line 23 and exchanger 25 to reflux drum 29. Liquid reflux is returned to the regenerator through line 31 and pump 32. Acetone and acid gases are sent to a low pressure acetone absorber 52 through line 33. This absorber operates at about 5 p.s.i.g.

The rich solvent leaving the absorber 26 at 34 at high pressure is then flashed through an expander 36 to about 250 p.s.i.g. pressure in drum 38 with the gases going overhead at 39. This gas is recycled back to the feed by compressor 41 and exchanger 41b in order to minimize the hydrogen loss from the product hydrogen stream to less than one percent. The solvent at 40 is then passed into a low pressure acid gas stripper 42 for stripping of waste gas. When this stripper 42 is operated at a pressure of substantially atmospheric, a carbon dioxide free stripping gas is introduced at 43. Introduction of dry nitrogen gas at 95° F. has been found to be satisfactory. The quantity of stripping gas can be decreased by operating stripper 42 at a partial vacuum. In fact, the system can even be operated without a stripping gas if stripper 42 operates at a low enough vacuum. Makeup acetone may be introduced into the system through line 66. The regenerated aqueous acetone is then circulated back by pump 46 to gas absorber 26 through line 27. The acetone in line 27 has a temperature of about 28° F.

Under the selected operating condition in stripper 42 there is sufficient autorefrigeration developed by the carbon dioxide stripping and by the acetone vaporization so that the cold acetone leaving by line 27 will set the desired operating conditions in absorber 26. Waste gas leaves the stripper 42 at 50 and passes through line 16 into the low pressure acetone absorber.

A water-solvent mixture from the low pressure absorber in line 56 is pumped through heat exchangers 57 and 57a and is passed by line 58 into an acetone-water fractionator 60 to recover the dissolved acetone. The water leaving the bottom of the acetone-water fractionator at 70 is pumped at 72 through heat exchanger 57a, 57b and 57 and through line 76 to the low pressure acetone absorber 52. Makeup water can be added or excess water can be purged by use of lines 57c to line 76. These purge lines keep the monoethanolamine concentration in the absorbent below 0.01 percent. An ammonia refrigeration system 75 is inserted in line 76 to provide refrigeration at approximately 40° F.

The recovered acetone is passed by line 170 to reflux drum 71. Noncondensibles are passed by line 73 to acetone absorber 52. The condensate is pumped through line 74 to reflux the fractionator 60. The recovered acetone is carried by lines 175 and 66 to acid gas stripper 42.

The acetone absorber 26 operates in the temperature range of −20° F. to +80° F. depending upon the concentration of carbon dioxide in the feed gas and upon the pressure of the feed gas. I avoid extreme low temperature conditions which would cause hydrates and operate at substantially higher temperatures and pressures with aqueous acetone (at least 2 weight percent and up to 10 weight percent water). While the circulation rate is not optimum, the avoidance of carbon dioxide solid hydrate problems and the avoidance of external refrigeration required for very low temperatures is more than offset by the other economies possible. Temperatures in the preferred range are achieved by the carbon dioxide as well as the vaporization of acetone in the waste gas leaving the stripping column. There is no need for heat exchangers on line 27. The available energy in expander 36 supplies part of the energy required by pump 46.

The solvent-water fractionator 60 may be used for water control in the solvent streams by drawing off a small stream 27a from the bottom of the low pressure stripper 42 and passing it by pump 27c through an upper part of fractionator 60.

While I have shown and described a preferred form of embodiment of my invention, I am aware that modifications may be made thereto which I consider to be within the scope and spirit of the disclosure herein and of the claims appended hereinafter.

I claim:

1. In combination with a process for the removal of acid gases from mixed gas of the type wherein hydrogen forms a substantial portion of the mixed gases and wherein the mixed gases are first contacted with a single absorbent aqueous acetone stream to absorb said acid gases and produce an acetone-containing purified hydrogen steam and the purified hydrogen stream is contacted with an acetone absorption medium to remove acetone and further remove acidic gas contaminants therefrom to yield a purified product gas, said purified product having an acidic gas contaminant level that has been reduced down to about 50 parts per million of carbon dioxide and about 1 part per million of hydrogen sulfide, the improvement comprising using a solution of monoethanolamine as the acetone absorption medium and maintaining a partial pressure of the acidic gas contaminant such that the acidic gas carrying capacity of the monoethanolamine solution exceeds that of an acetone solution.

2. The process of claim 1 wherein the monoethanolamine solution is an aqueous solution that contains about 15 percent by weight of monoethanolamine.

3. The process of claim 1 wherein monoethanolamine is recovered from the monoethanolamine-acetone solution and the monoethanolamine solution is recycled for further contact with a stream of mixed gases that contains acetone.